United States Patent [19]
Pulli et al.

[11] Patent Number: 5,473,128
[45] Date of Patent: Dec. 5, 1995

[54] CEILING MOUNTED SWITCH

[75] Inventors: Hannu H. Pulli, Westborough; Dan R. Test, Winchester, both of Mass.

[73] Assignee: C&K Components, Inc., Watertown, Mass.

[21] Appl. No.: 260,562

[22] Filed: Jun. 16, 1994

[51] Int. Cl.$^6$ .................................................. H01H 9/00
[52] U.S. Cl. ........................ 200/292; 200/293; 200/295; 200/303
[58] Field of Search ..................................... 200/292, 293, 200/295, 303, 512, 520, 547, 548, 564, 565, 308, 309, 310, 311, 312, 313, 314, 315, 316, 5 A; 361/748, 749, 750, 751, 752, 753, 754, 755–759

[56] References Cited

U.S. PATENT DOCUMENTS

| | | | |
|---|---|---|---|
| 5,059,754 | 10/1991 | Kaichi et al. | 200/293 |
| 5,211,282 | 5/1993 | Ting | 200/292 |

Primary Examiner—Henry J. Recla
Assistant Examiner—David J. Walczak
Attorney, Agent, or Firm—Pearson & Pearson

[57] ABSTRACT

A ceiling mounted wireless wall switch which has three main parts a base, a cover and a printed circuit assembly. The printed circuit assembly is mounted on the base and the base is mechanically engaged to the cover. The base portion of the base has a peripheral edge which has a series of upwardly extending spring fingers spaced around the peripheral edge and the spring fingers are spaced from each other and adapted to engage the cover. The cover has a base section, a, first wall and a second wall circumscribed by the first wall. The first wall has an inner surface with a series of pairs of spaced ribs positioned on the inner surface of the first wall, each of the pairs of spaced ribs defining a slide area, each of the slide areas having an impression formed there on and each of the slide areas has a top which is spaced from the base section. The top is open and each of the spring fingers engages one of the impressions.

2 Claims, 8 Drawing Sheets

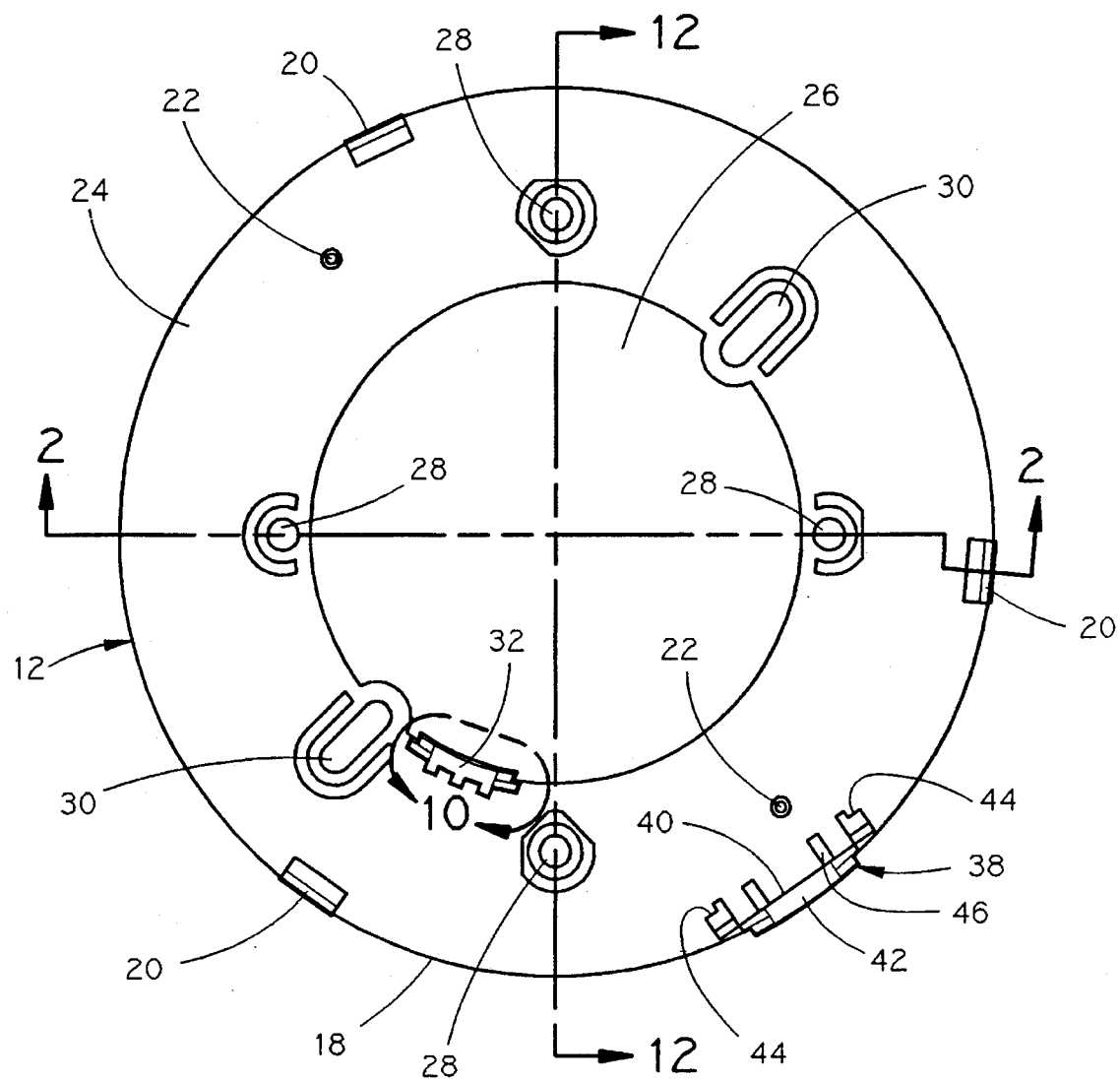
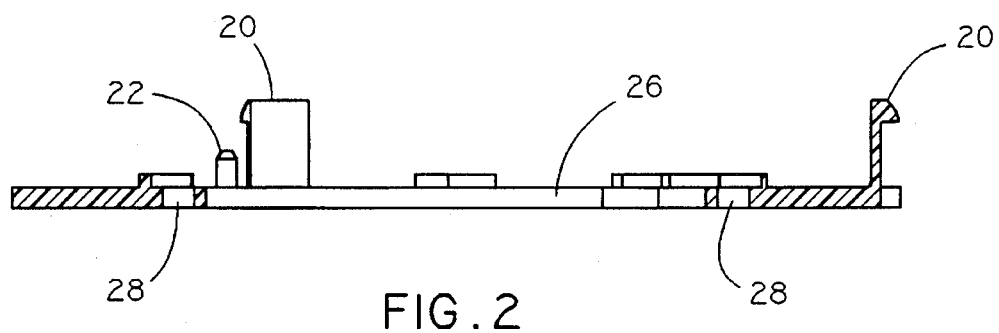

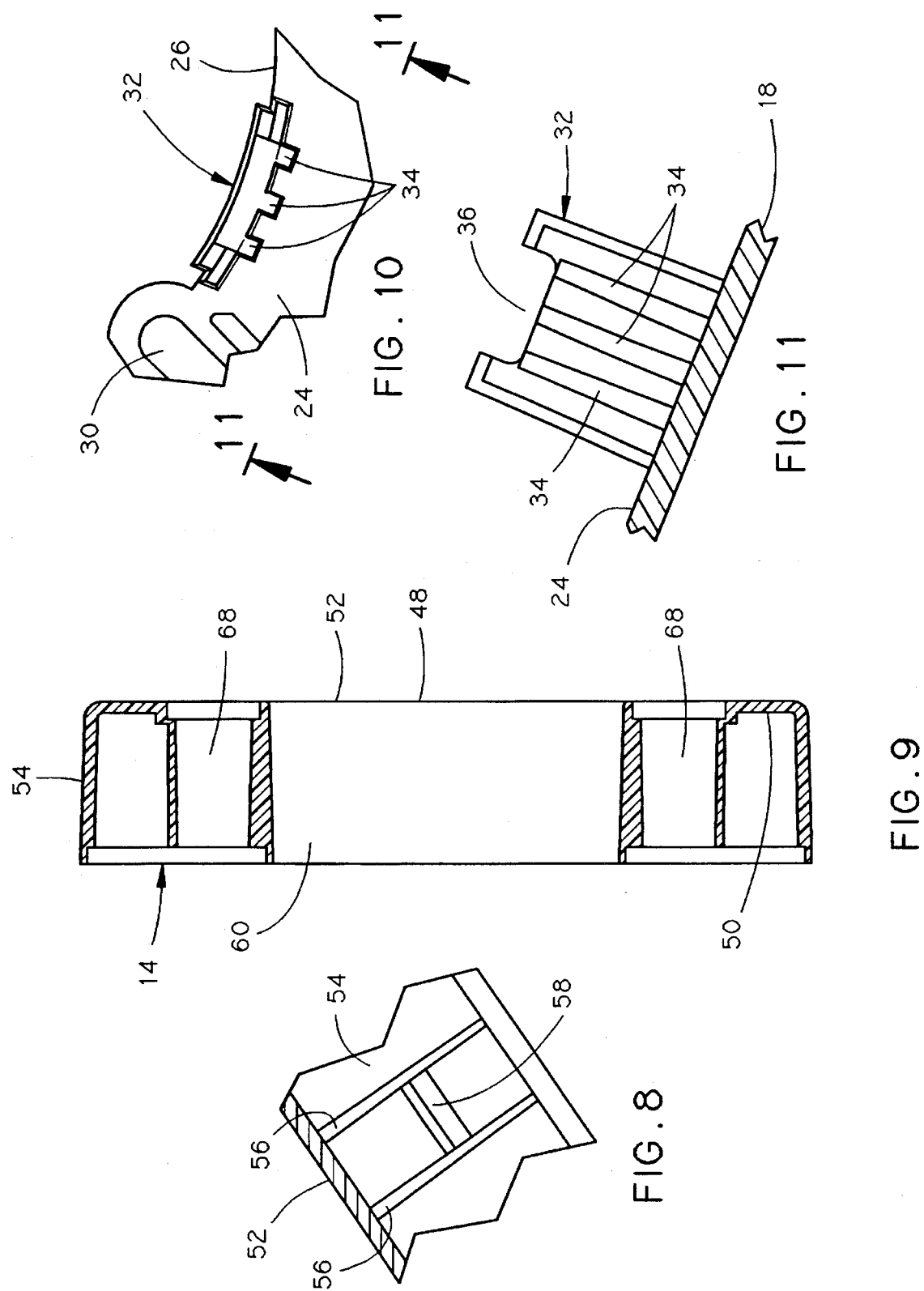

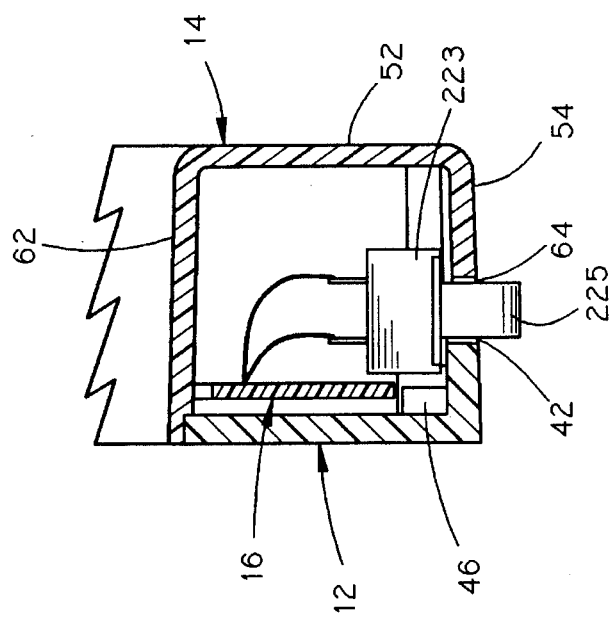
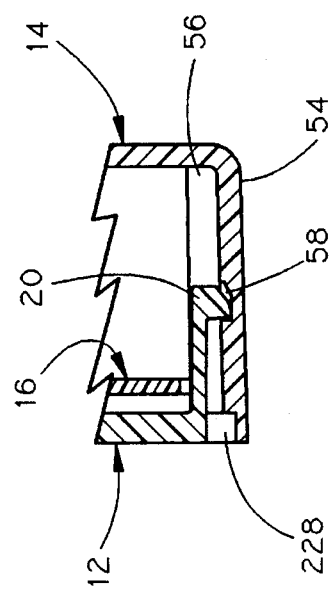
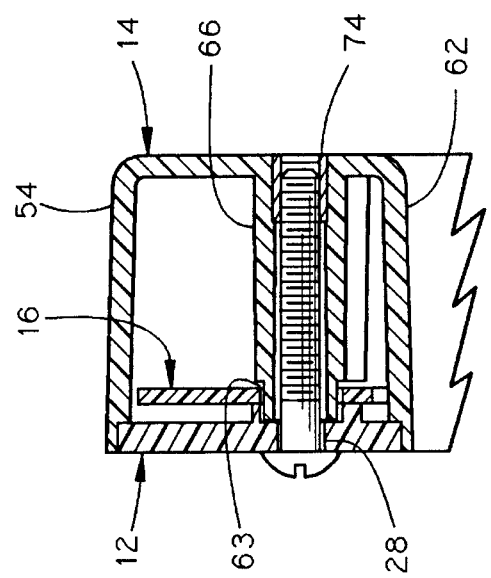

CEILING MOUNTED SWITCH

BACKGROUND OF THE INVENTION

This invention relates to a ceiling mounted switch for remote operation from a wall switch.

SUMMARY OF THE INVENTION

The invention is a ceiling mounted wireless wall switch comprising a base, a cover and a printed circuit assembly.

BRIEF DESCRIPTION OF THE DRAWINGS

Further details are explained below with the help of the example(s) illustrated in the attached drawings in which:

FIG. 1. is a top plan view of the base according to the present invention;

FIG. 2. is a sectional view of the base taken on line 2—2 of FIG. 1;

FIG. 8 is an elevational view of a pair of spaced ribs taken on line 8—8 of FIG. 6;

FIG. 9 is a sectional view of the assembly taken on line 9—9 of FIG. 6.

FIG. 10 is a top plan detail view of the vertical extension taken on circled 10 of FIG. 1.

FIG. 11 is a side elevational view of the vertical extension taken on line 10—10 of FIG. 1;

FIG. 14 is a side elevational view taken on line 14—14 of FIG. 13;

FIG. 15 is a side elevational view taken on line 15—15 of FIG. 13;

FIG. 16 is a side elevational view taken on line 16—16 of FIG. 13; and

DESCRIPTION OF THE PREFERRED EMBODIMENT(S)

Figure 3:
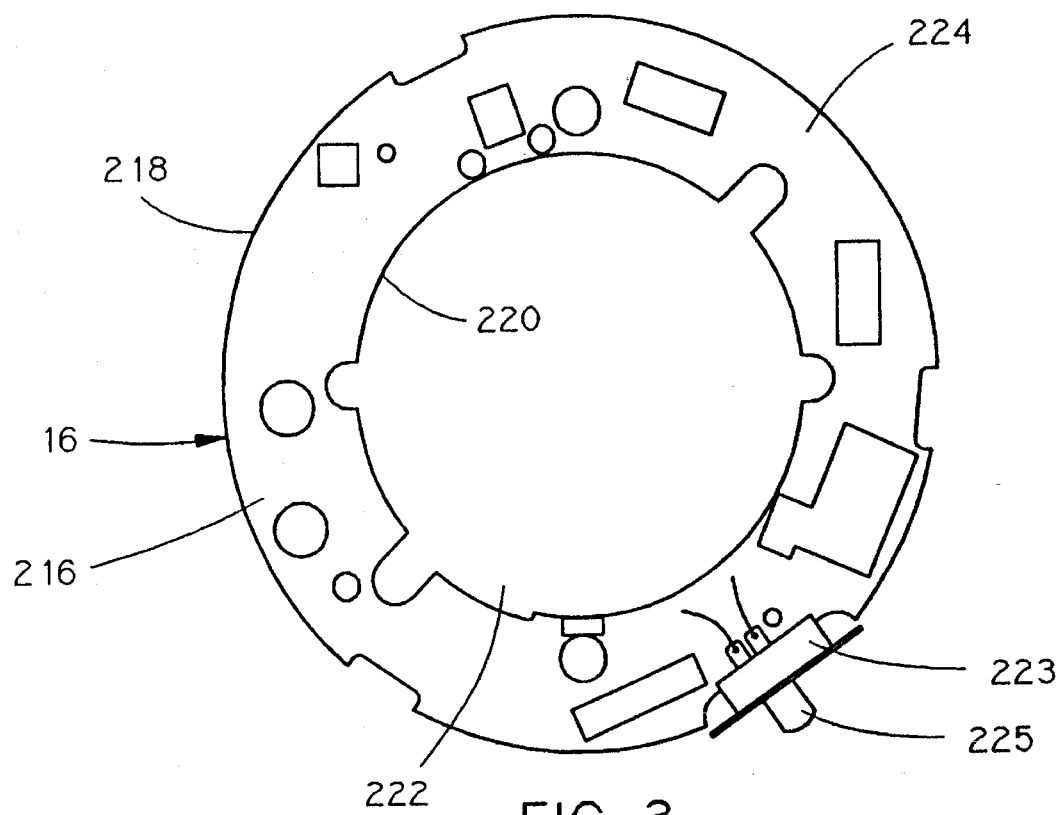
FIG. 3 is a top plan view of the printed circuit board according to the present invention.
Figure 4:
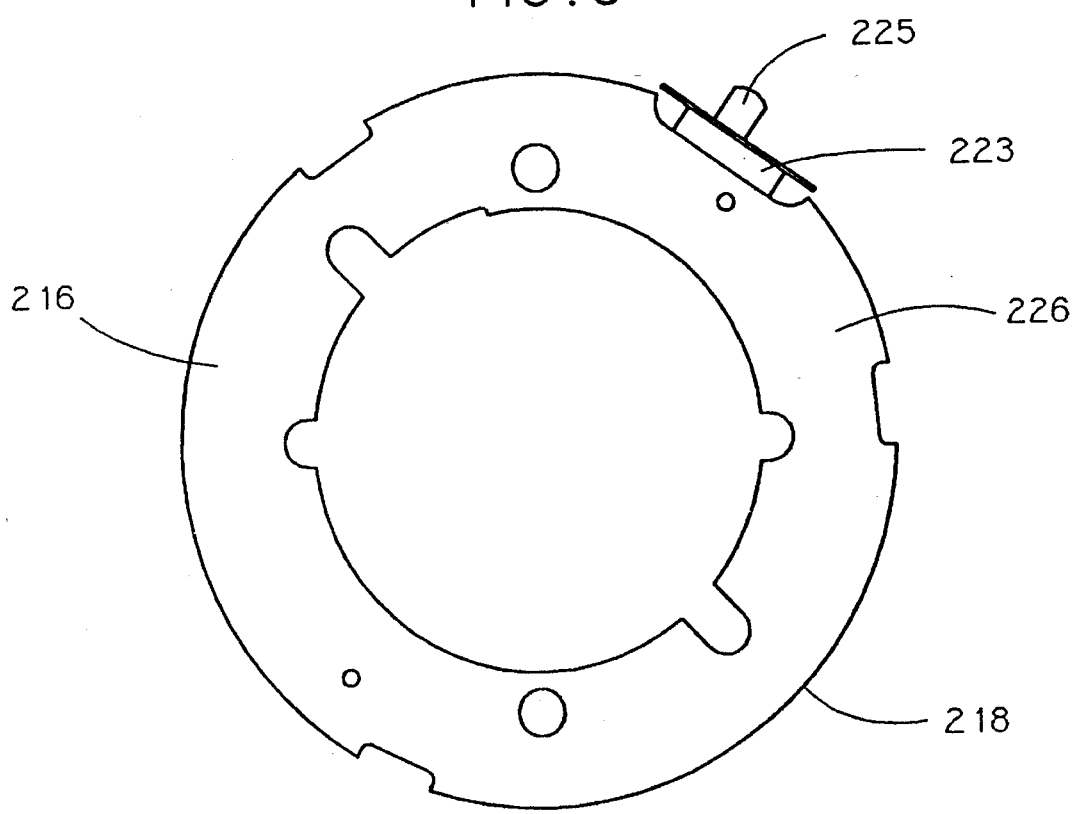
FIG. 4 is a bottom plan view of the printed circuit board shown in FIG. 3.
Figure 5:
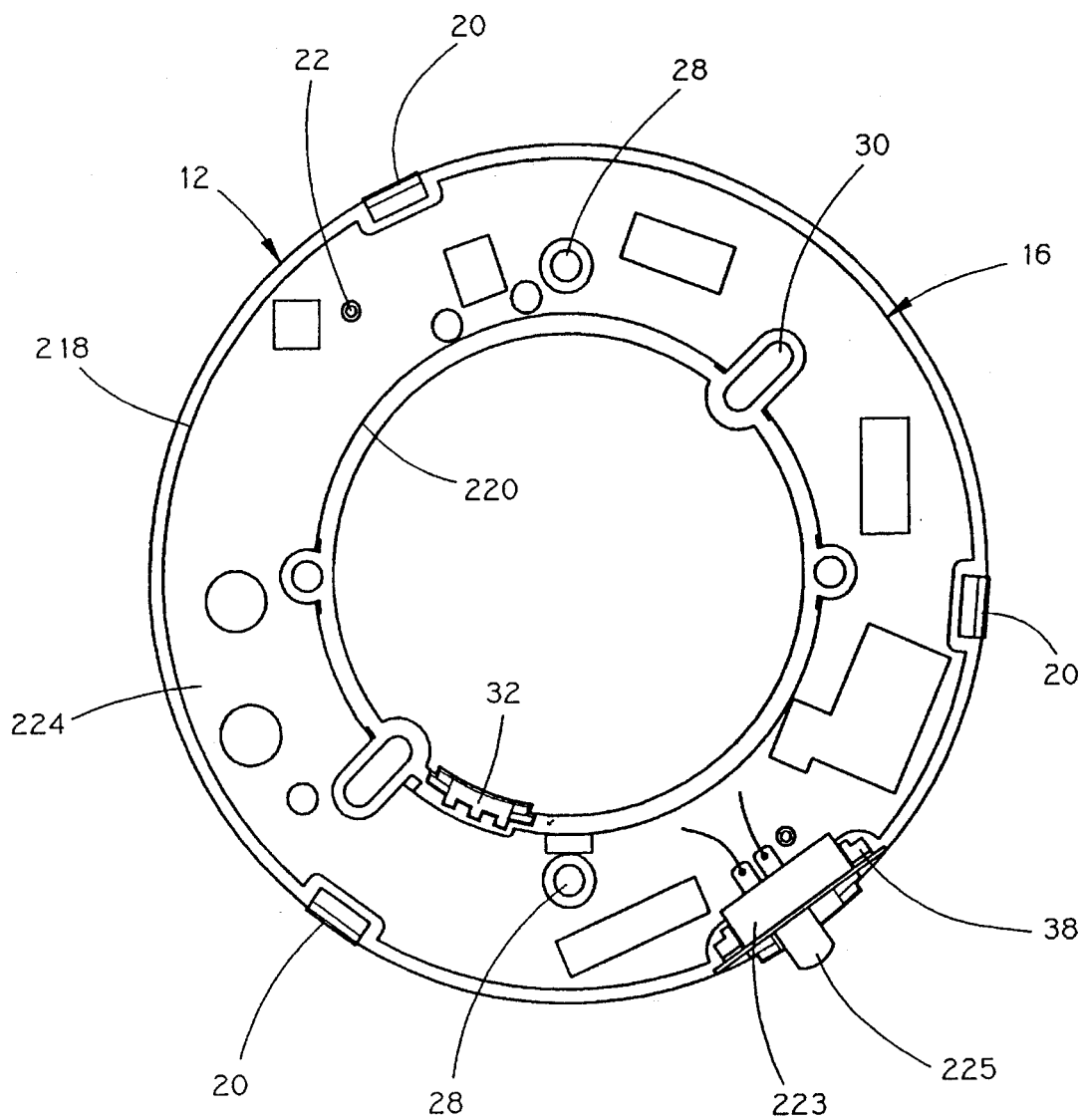
FIG. 5 is a top plan view of the subassembly of the printed circuit board and the base according to the present invention.

There is shown in the drawings, a ceiling mounted wireless wall switch 10 comprising a base 12, a cover 14 and a printed circuit assembly 16 that, as described later, can be operated remotely by a wall switch.

The base 12 includes a plastic base portion 18 having the configuration of an annular ring. Spaced around the periphery of the base portion 18 are a series of upwardly extending spring fingers 20 which are spaced from each other an equal distance and which are located slightly inward of the periphery of the base portion 18. Two locating pegs 22 are positioned on the upper surface 24 on opposite sides of an inner, through, circular aperture 26. There are a series of through, circular holes 28 which are spaced from each other and in close proximity to the inner, circular aperture 26. A pair of elongated mounting apertures 30 are positioned on opposite sides of the inner, circular aperture 26 as shown in FIG. 1. A vertical extension 32 is placed at the wall of the inner, circular aperture 26 and includes at its outwardly facing surface three spaced, vertical ribs 34, a transverse rectangular indentation 36 and is open at one end as shown in FIG. 11. A slide switch holder 38 is positioned at the periphery of the base portion 18, as shown in FIG. 1. The slide switch holder 38 includes an erect back portion 40 with a rectangular notch 42 formed at its free end. A substantially rectangular post 44 is provided at each side of the back portion 40 and a pair of tabs 46 extend from the base portion 18 to abut the back portion 40. The slide switch holder 38 is in close proximity to one of the locating pegs 22 as shown in FIG. 1.

Figure 6:
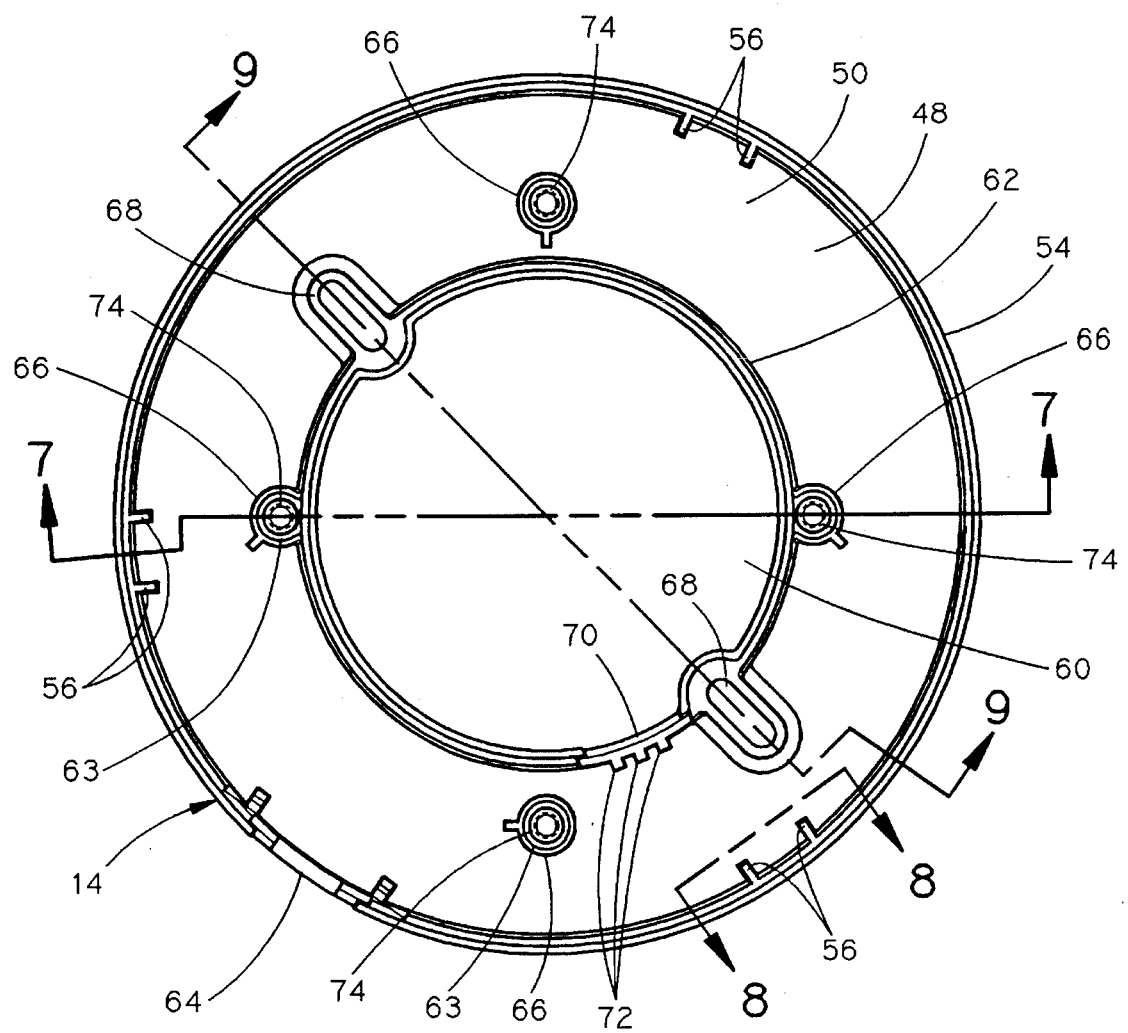
FIG. 6 is a bottom plan view of the cover according to the present invention.
Figure 7:
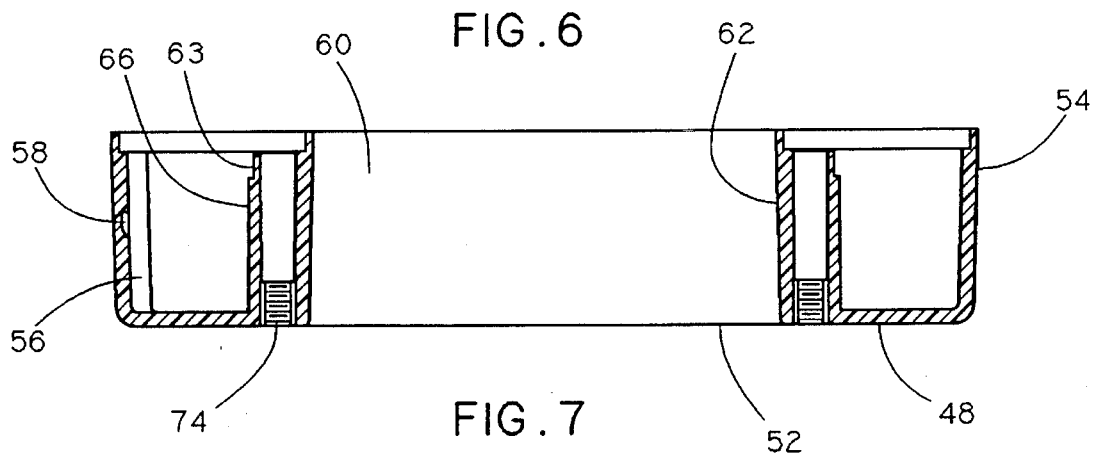
FIG. 7 is sectional view of the cover taken on line 7—7 of FIG. 6.
Figure 13:
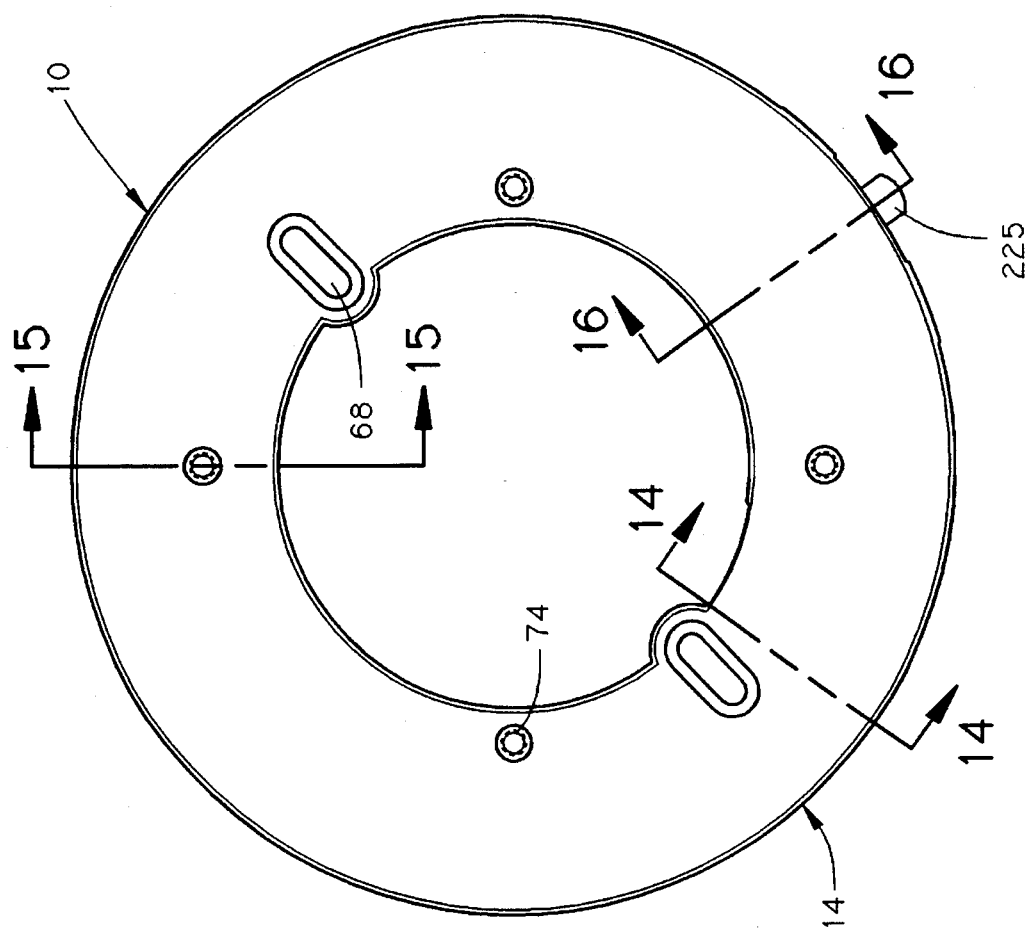
FIG. 13 is a top plan view of the assembled ceiling mounted wireless wall switch according to the present invention.
Figure 12:
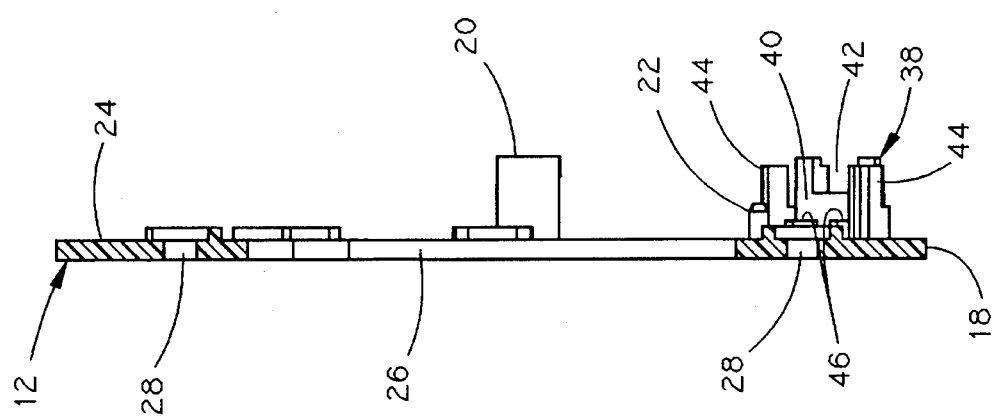
FIG. 12 is a side elevational view taken on line 12—12 of FIG. 1.

The cover 14 as shown in FIGS. 6 through 9 includes a plastic, base section 48 having a bottom surface 50, an upper surface 52 and the configuration of an annular ring. Extending from the periphery of the base section 48 is an upright first wall 54. Three pair of spaced vertical ribs 56 are placed on the inner surface of the first wall 54. The three pairs of spaced vertical ribs 56 are spaced from each other around the circumference of the upright first wall 54, each pair providing a slide area. Each of the slide areas has a horizontal, rectangular impression 58 which transverses the slide area and which is open at the top one of which is shown in FIG. 8. Extending from the periphery of an inner through perforation 60 of the base section 48 is an upright second wall 62. A rectangular indentation 64 is provided in the upright first wall 54 spaced from the three pair of spaced vertical ribs 56 as shown in FIG. 6 There are a series of through, vertical, tubes 66 which are spaced from each other, two of which abut the upright second wall 62 and two of which are in close proximity to the upright second wall 62 as shown in FIG. 6. The vertical, tubes 66 are circumscribed by the first wall 54 and each has a terminal end 63 of smaller external diameter than the rest, or main body portion of each of the tubes 66. A pair of elongated, extended, mounting apertures 68 are positioned on opposite sides of the upright second wall 62 as shown in FIG. 6. A second slot 70 is formed in the upright second wall 62, open at one end and terminating short of the base section 48. Directly above the second slot 70 are three spaced, vertical projections 72. A threaded, metal insert 74 is mounted on the inner surface of each of the tubes 66 at the base section 48.

Figure 17:
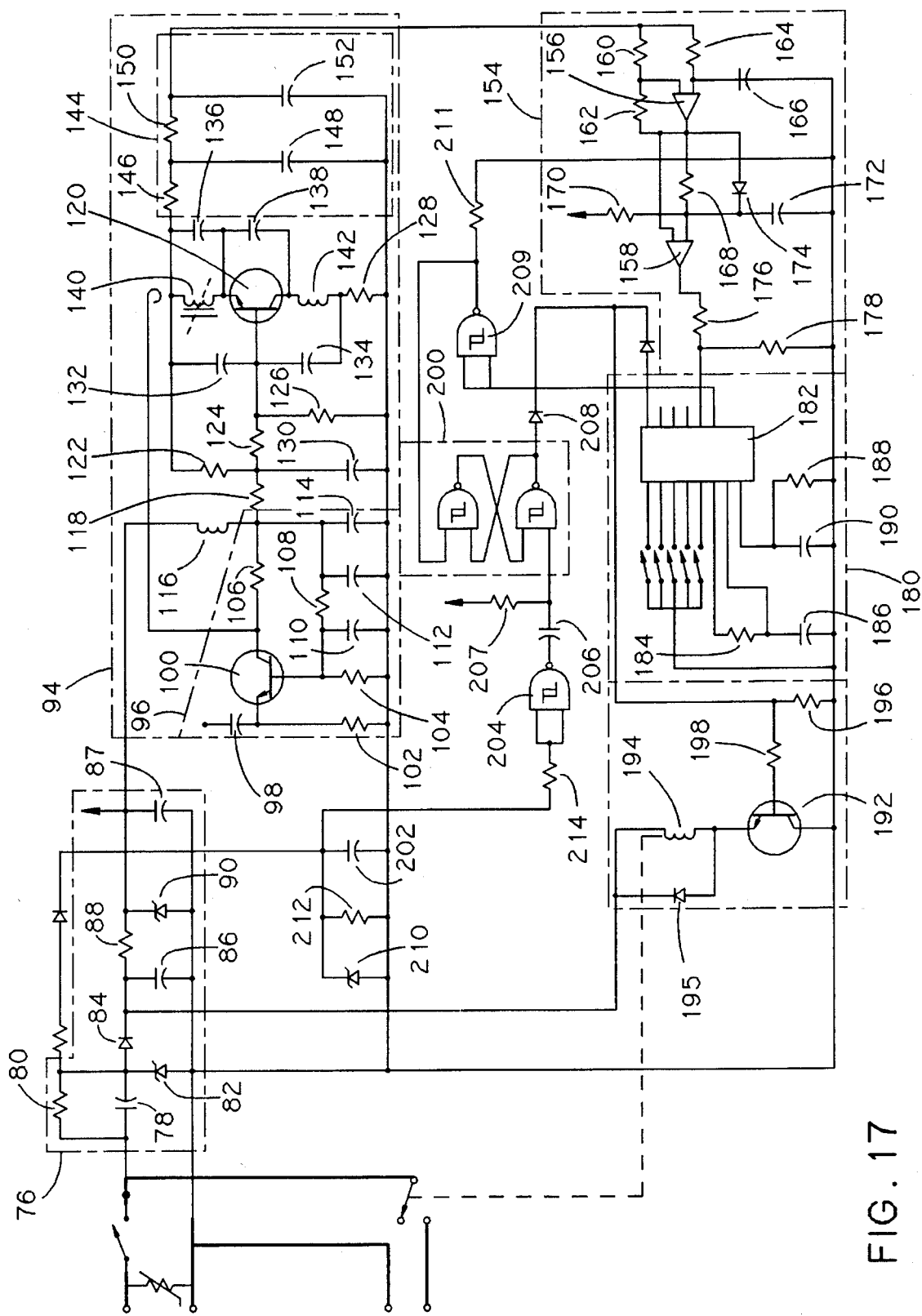
FIG. 17 is the schematic of the electric circuitry and components of the printed circuit board according to the invention.

There is shown in the schematic at FIG. 17, a power supply 76 including a capacitor 78, a resistor 80, a discharging resistor, and a voltage limiting zener diode 82. The voltage limiting zener diode 82 is connected to the rectifier 84 which converts the AC current to a DC current. The rectifier 84 is connected to a filter capacitor 86 and a current limiting resistor 88. The current limiting resistor 88 is connected to a zener diode 90 which limits the DC voltage to 5.1 volts. The power supply 76 components ends with the filtering capacitor 87. The next large block of components forms the receiver 94. Part of the receiver 94 includes an amplifier 96 which comprises a coupling capacitor 98 which couples the signal from a transmitter (not shown) to the first transistor 100. The resistors 102, 104, 106 and 108 set the operating point for the first transistor 100. The capacitors 110, 112, 114 function to reduce radio frequency noise which may be present. A coil 116, which is part of the receiver 94, connects to the antenna amplifier 96 as shown in FIG. 17. The coil 116 reduces radio frequencies radiating from the receiver. A limiting resistor 118 connects to a very sensitive second transistor 120 which acts as an oscillator. Resistors 122, 124, 126 and 128 set the operating point for the second transistor 120. A capacitor 130 performs as a filter capacitor. A capacitor 132 functions as a feed back capacitor and a capacitor 134 sets the low frequency. The second transistor 120 runs at high frequency (approximately 312 Mhz) which is alternated between an oscillating and non-oscillating condition by a lower frequency. The second transistor 120 functions as a typical superregenerative receiver. Capacitors 136 and 138 which are connected in series and an inductor 140 set the high frequency. A coil 142 which functions to block high frequency, is connected to the emitter of the second transistor 120 and the resistor 128. The resistor 128 connects to connects to ground. The signal from the receiver 94 is sent to a low pass filter 144, which comprises two resister-capacitor sets. The first set being a resistor 146 and a capacitor 148; the second set being a resistor 150 and a capacitor 152. The two resister-capacitor sets are connected together. This system filters the high frequency and passes the low frequency. The signal is next sent to an amplifier 154 which includes a first operational amplifier 156 and a second operational amplifier 158. The operating point of the first operational amplifier 156 are set by the resistors 160, 162, 164 and the capacitor 166. The second operational amplifier 158 is utilized as a comparitor. The resistors 168, 170 and the capacitor 172 sets the operating point of the second operational amplifier 158. The diode 174 functions to permit charging of the capacitor 172 when the first operational amplifier 156 goes high. The resistors 176, 178 function as a voltage divider and connect to the decoder 180. The decoder 180 incorporates a decoder IC 182. Two resister-capacitor sets, comprising the first set of the resistor 184 and the capacitor 186 and the second set the resistor 188 and the capacitor 190, set the operating frequency for the decoder IC 182. Electrically, the next component is a transistor relay driver 192 which powers the relay coil 194. The diode 195 is a auto fade ems diode. The two resistors 196, 198 set the operating point for the transistor relay driver 192. The diode 195 functions as a protective diode for the relay coil 194. The circuit we have described thus far can be activated, for example, by a wall mounted transmitter (not shown). The Homemate Transmitter manufactured by the Espion Company would work satisfactorily.

The main function of the flip-flop 200 shown in the schematic is to activate the relay coil 194 from the existing wall switch (not shown). If you turn the wall switch on and then turn it off and immediately turn it on again it will activate the relay coil 194. The electronic components that accomplish this will now be described. The capacitors 86, 87 of the power supply 76 will hold operating power for a short period after the electric power is off. This causes the capacitor 202 to lose voltage and go low causing the inverter 204 to go high. If the power is now rapidly turned on, the inverter 204 will go low which in turn pulses the flip-flop 200 on. The coupling capacitor 206 assures the pulse to the flip-flop 200 is regulated. The resistor 207 is a pull up resistor. The output of the flip-flop 200 passes through the diode 208 activating the relay 194. The inverter 209 resets the the flip flop 200 and the resistor 211 is a pull down resistor. The voltage limiting zener diode 210 protects the input of the inverter 204. The resistor 212 acts as a load when the capacitor 202 discharges. The resistor 214 functions to limit current.

The electrical and electronic components of the printed circuit assembly 16 are mounted on a plastic support portion 216 having the configuration of an annular ring whose external diameter is slightly less than the base 12. The support portion 216 includes an outer circumference 218 defining its border and having a circular perimeter 220 defining an inner through opening 222. The circular perimeter 220 is slightly more than inner through aperture 26 of the base 12. Arced indentations and two through apertures are provided at predetermined areas of the perimeter 220 which correspond to the position of the holes 28 and elongated apertures 30 of the base 12. Slots are formed in the outer circumference 218 which correspond to the position of the spring fingers 20 of the base 12. A slide switch 223 is mounted on the support 216 in a position corresponding to the position of the slide switch holder 38 with the slide 225 of the slide switch 223 extending beyond the outer circumference of the circular base portion 18. The support portion 216 has an uppermost surface 224 and on the other side a lowermost surface 226. When the lowermost surface 226 of the support portion 216 abuts the circular base portion 18 a coaxial relationship is established between the arced Indentations and two through apertures and the holes 28 and elongated apertures 30 of the base 12 and between the slots formed in the outer circumference 218 and the spring fingers 20 of the base 12. The diameter of the opening 222 defined by the perimeter 220 is more than the diameter of the inner through aperture 26 and the external perimeter of the base 12 is slightly greater then the support portion 216 forming a shoulder therewith. To attach the cover 14 to the assembly of the base 12 and the support portion 216, the terminal end 63 of each vertical, tube 66 abuts the upper surface 24 in coaxial relation with the hole 28 formed in the base 12, simultaneously the shelf formed by the narrowed end of the second wall 62 is positioned on the shelf formed by the difference in the diameter of the opening 222 and the inner through aperture 26 and the shelf formed by the narrowed end of the first wall 54 is positioned on the shoulder formed by the difference in diameter of the external perimeter of the base 12 and the support portion 216. At the same time the mounting apertures 68 are coaxially aligned with the elongated apertures 30 of the base 12 and the second slot 70 provides a shoulder to shoulder engagement with the vertical extension 32. The projections 72 above the slot 70 and the ribs 34 of the vertical extension 32 trap wires that are passed out from the support portion through the inner through aperture 26. Concurrently the engaged slide switch 223 fits within the rectangular indentation 64 and the spring fingers 20 of the of the base 12 engage the horizontal rectangular impression 58 of the vertical ribs 56 of the first wall 54 to hold the total assemble in place. Silicone adhesive is then passed through a portion of the notch way 228 reinforcing the engagement of the spring fingers 20. The adhesive is prevented from entering the main portion of the switch 10 by the vertical ribs 56 and the engaged spring fingers 20.

What I claim is:

1. A ceiling mounted switch adapted for operation from a remote wall switch comprising:

A) a base having a base portion with a periphery and a plurality of upwardly extending spring fingers spaced about the periphery of the base portion and from each other, B) a cover having a base section and a first wall, the base section of the cover having a centrally positioned inner through perforation, the inner perforation having a periphery and an upright second wall extending from the periphery, the second wall being circumscribed in spaced parallel relation by the first wall and the second wall having an upper end remote from the base section, the first wall having an inner surface and a series of pairs of spaced ribs positioned on an inner surface of the first wall, each of the pairs of spaced ribs defining a slide area having an impression formed thereon, the impression transversing each of the slide areas, each of the slide areas having an open top remote from the base section, each of said spring fingers being adapted for engaging one of the impressions thereby to attach said cover to said base, and C) a printed circuit assembly mounted on the base within a cavity formed by the base and the cover.

2. The ceiling mounted switch as set forth in claim 1 wherein the base section of the cover normally lies in a horizontal plane and has a plurality of spaced, vertical through tubes extending therefrom with two of said tubes abutting the upright second wall and two of said tubes being spaced from the upright second wall, all of said tubes being circumscribed by the first wall and each of tubes having a main body portion and a terminal end having a smaller external diameter than the diameter of said body portion.

* * * * *